(12) United States Patent
Cho et al.

(10) Patent No.: US 12,198,075 B2
(45) Date of Patent: Jan. 14, 2025

(54) CORRELATE MULTIPLE NOTES IN A DATABASE USING BI-DIRECTIONAL LINK

(71) Applicant: FASOO.COM CO., LTD., Seoul (KR)

(72) Inventors: Kyu Gon Cho, Goyang-si (KR); Jong Sin Choi, Seoul (KR); Bum Jong Lee, Seoul (KR)

(73) Assignee: Fasoo, Seoul (KR)

( * ) Notice: Subject to any disclaimer, the term of this patent is extended or adjusted under 35 U.S.C. 154(b) by 0 days.

(21) Appl. No.: 17/136,216

(22) Filed: Dec. 29, 2020

(65) Prior Publication Data

US 2021/0117834 A1 Apr. 22, 2021

Related U.S. Application Data

(63) Continuation of application No. 16/066,576, filed as application No. PCT/KR2016/012474 on Nov. 1, 2016, now Pat. No. 10,896,291.

(30) Foreign Application Priority Data

Dec. 28, 2015 (KR) .......................... 10-2015-0187837

(51) Int. Cl.
*G06F 16/00* (2019.01)
*G06F 16/36* (2019.01)
(Continued)

(52) U.S. Cl.
CPC ............ *G06N 5/048* (2013.01); *G06F 16/00* (2019.01); *G06F 16/36* (2019.01); *G06F 40/169* (2020.01);
(Continued)

(58) Field of Classification Search
None
See application file for complete search history.

(56) References Cited

U.S. PATENT DOCUMENTS 6,321,192 B1 * 11/2001 Houchin ............. G06F 16/3334
707/999.005
7,921,105 B2 * 4/2011 Toyoda ................. G16B 50/00
707/730
(Continued)

FOREIGN PATENT DOCUMENTS

JP 2008-59099 A 3/2008
KR 1020100084690 A 7/2010
(Continued)

*Primary Examiner* — Jean M Corrielus
(74) *Attorney, Agent, or Firm* — AJU IP Global PLLC

(57) ABSTRACT

Disclosed are a method and device for calculating a correlation between notes using a database constructed on a basis of artificial intelligence, and supporting a service for the notes on a basis of the calculated correlation. A method by which a note providing device that interworks with a user terminal provides notes, includes: constructing a keyword DB by extracting a keyword from a note generated through the user terminal and reflecting a weight calculated through machine learning using the extracted keyword; and calculating a correlation score for each of a plurality of target notes correlated with a reference note using the keyword DB. Therefore, the method and device for providing the notes using the artificial intelligence-based correlation calculation can more accurately recommend the correlated notes by reflecting the interaction of the user.

20 Claims, 6 Drawing Sheets

(51) Int. Cl.
  *G06F 40/169* (2020.01)
  *G06F 40/216* (2020.01)
  *G06F 40/242* (2020.01)
  *G06F 40/279* (2020.01)
  *G06N 5/022* (2023.01)
  *G06N 5/048* (2023.01)
  *G06N 20/00* (2019.01)

(52) U.S. Cl.
  CPC .......... *G06F 40/216* (2020.01); *G06F 40/242* (2020.01); *G06F 40/279* (2020.01); *G06N 5/022* (2013.01); *G06N 20/00* (2019.01)

(56) References Cited

U.S. PATENT DOCUMENTS

| | | | |
|---|---|---|---|
| 8,209,320 B2* | 6/2012 | Reitter | G06F 16/951 707/709 |
| 8,549,410 B2 | 10/2013 | Hoyle | |
| 8,874,504 B2* | 10/2014 | King | G06F 16/382 707/608 |
| 8,949,377 B2* | 2/2015 | Makar | G06Q 30/0253 709/219 |
| 9,117,006 B2 | 8/2015 | Zhu | |
| 9,348,802 B2* | 5/2016 | Massand | G06F 16/00 |
| 9,600,460 B2 | 3/2017 | Gilead | |
| 10,191,999 B2 | 1/2019 | Liu | |
| 11,100,523 B2* | 8/2021 | Treiser | G06F 16/288 |
| 2003/0204496 A1 | 10/2003 | Ray | |
| 2007/0174319 A1* | 7/2007 | Chou | G06F 16/3326 |
| 2007/0174320 A1 | 7/2007 | Chou | |
| 2007/0288454 A1* | 12/2007 | Bolivar | G06Q 30/02 707/999.005 |
| 2007/0288514 A1* | 12/2007 | Reitter | G06F 16/903 707/E17.135 |
| 2008/0294624 A1* | 11/2008 | Kanigsberg | G06Q 30/0269 707/999.005 |
| 2009/0125462 A1* | 5/2009 | Krishnaswamy | G06Q 30/02 706/12 |
| 2009/0204611 A1 | 8/2009 | Kamada et al. | |
| 2011/0078101 A1* | 3/2011 | Gotz | G06Q 40/06 706/46 |
| 2013/0036121 A1* | 2/2013 | Kim | G06F 16/954 707/E17.014 |
| 2013/0173614 A1* | 7/2013 | Ismalon | G06F 16/93 707/723 |
| 2013/0246901 A1* | 9/2013 | Massand | G06F 40/197 715/229 |
| 2013/0290320 A1 | 10/2013 | Zhu | |
| 2014/0019438 A1* | 1/2014 | Le Chevalier | G06F 16/248 707/741 |
| 2014/0019562 A1* | 1/2014 | Le Chevalier | G06F 40/106 715/230 |
| 2014/0019846 A1* | 1/2014 | Gilead | G06F 16/248 715/234 |
| 2014/0156681 A1 | 6/2014 | Lee | |
| 2014/0289239 A1 | 9/2014 | Kanigsberg | |
| 2014/0289289 A1 | 9/2014 | Fujioka | |
| 2014/0372216 A1 | 12/2014 | Nath et al. | |
| 2015/0074102 A1* | 3/2015 | Ismalon | G06F 16/242 707/734 |
| 2015/0088491 A1* | 3/2015 | Fume | G06F 40/295 704/9 |
| 2015/0317302 A1 | 11/2015 | Liu | |
| 2016/0026720 A1* | 1/2016 | Lehrer | G06Q 10/103 707/710 |
| 2018/0247268 A1 | 8/2018 | Vanasco | |

FOREIGN PATENT DOCUMENTS

| | | |
|---|---|---|
| KR | 1020110135226 A | 12/2011 |
| KR | 1020120014796 A | 2/2012 |

* cited by examiner

FIG. 2

| KEYWORD | WEIGHT |
|---|---|
| DIGITAL | 1.002 |
| MESSAGE | 1.001 |
| USER | 1.003 |
| SERVICE | 1.002 |
| CONTACT | 1.006 |
| EMAIL | 1.009 |
| PHONE NUMBER | 1.106 |

FIG. 3

| KEYWORD | PAGE UID | TERM COUNT |
|---|---|---|
| BUSINESS PLAN | 1 | 3 |
| BUSINESS PLAN | 3 | 1 |
| BUSINESS PLAN | 7 | 1 |
| BUSINESS PLAN | 9 | 3 |
| HOMECOMING | 1 | 1 |
| HOMECOMING | 9 | 3 |
| HOMECOMING | 18 | 6 |

FIG. 6

Note Base

| Term | Weight |
|---|---|
| this | 1.0 |
| is | 1.1 |
| a | 1.2 |
| sample | 1.3 |

(a)

Note 1

| Term | Term Count |
|---|---|
| this | 1 |
| is | 1 |
| another | 2 |
| example | 3 |

(b)

Note 2

| Term | Term Count |
|---|---|
| this | 1 |
| is | 1 |
| another | 2 |
| sample | 3 |

(c)

Note 3

| Term | Term Count |
|---|---|
| this | 1 |
| is | 1 |
| a | 2 |
| document | 3 |

(d)

__US 12,198,075 B2__

CORRELATE MULTIPLE NOTES IN A DATABASE USING BI-DIRECTIONAL LINK

CROSS REFERENCE TO RELATED APPLICATION

This patent application claims priority to Korean Patent Application No. 10-2015-0187837 filed on Dec. 28, 2015, PCT Patent Application No. PCT/KR2016/012474 filed on Nov. 1, 2016, and U.S. patent application Ser. No. 16/066,576 filed on Aug. 14, 2018, which are all incorporated by reference in their entireties.

BACKGROUND

1. Technical Field

The present invention relates to a note support technique and, more particularly, to a method and device for calculating a correlation between notes by using a database constructed on a basis of artificial intelligence and supporting a service for the notes on a basis of the calculated correlation.

2. Related Art

Personal digital assistants such as smart phones offer various functions such as memos, notes, diaries, dictionaries, digital cameras, and web browsing in addition to simple call functions.

Among them, the most basic function, which is the memo or note function, provides a function of storing a memorable item in a portable terminal even without a pen or a piece of paper.

However, the current note function can only arrange and store text information, and therefore there is a limitation in providing functions of transferring, searching, and sharing information.

In particular, since the present note function mainly provides, as a correlated note, a note in which a keyword tagged by the user is included in a text, there is a problem that the note is exposed as the correlated note because the same keyword is included even when there is no actual correlation, which causes user inconvenience.

SUMMARY

Example embodiments of the present invention provide a note providing method performed in a note providing device that interworks with a user terminal.

The node providing method may comprise constructing a keyword DB by extracting a keyword from a note generated through the user terminal and reflecting a weight calculated through machine learning using the extracted keyword and calculating a correlation score for each of a plurality of target notes correlated with a reference note using the keyword DB.

The calculating of the correlation score may comprise calculating a significance of a specific keyword using the number of times that the specific keyword among keywords included in the reference note is extracted from each of the plurality of target notes, and the number of notes in which the specific keyword is included among a group of notes including the reference note and the plurality of target notes and calculating the correlation score using a value obtained by applying the weight for the specific keyword to the significance of the specific keyword.

The calculating of the correlation score using the value obtained by applying the weight for the specific keyword to the significance of the specific keyword may comprise calculating the correlation score by sequentially determining the keywords included in the reference note as the specific keyword, and adding the values obtained by applying the weight for each of the specific keywords to the significance of the specific keyword calculated for each of the determined specific keyword.

The node providing method may further comprise providing the plurality of target notes correlated with the reference note through the user terminal according to ranking of the correlation scores.

The node providing method may further comprise receiving feedback through the user terminal on whether or not to accept each of the plurality of target notes provided according to the ranking of the correlation scores.

The constructing of the keyword DB may comprise updating the weight according to whether or not to accept each of the plurality of target notes.

The constructing of the keyword DB may comprise when accepting a specific target note among the plurality of target notes, increasing the weights of the keywords that are common to the reference note and the specific target note, and when rejecting a specific target note among the plurality of target notes, decreasing the weights of the keywords that are common to the reference note and the specific target note.

The node providing method may further comprise excluding a keyword in which the updated weight is determined to be less than or equal to a preset value from the keywords by adding the keyword to an exclusion dictionary.

Example embodiments of the present invention also provide a note providing method performed in a user terminal that interworks with a note providing device.

The note providing method performed in a user terminal may comprise receiving an input of a user to create a note, constructing a keyword DB based on a keyword included in the note and a weight for the keyword by transferring the created note to the note providing device, extracting a reference note corresponding to a request of the user for browsing and receiving a plurality of target notes correlated with the reference note from the note providing device and displaying the reference note and the plurality of target notes.

The displaying of the reference note and the plurality of target notes may comprise displaying the plurality of target notes according to ranking of correlation scores calculated for each of the plurality of target notes correlated with the reference note using the keyword DB.

The correlation scores may be calculated by calculating a significance of a specific keyword using the number of times that the specific keyword among keywords included in the reference note is extracted from each of the plurality of target notes and the number of notes in which the specific keyword is included among a group of notes including the reference note and the plurality of target notes, and using a value obtained by applying a weight for the specific keyword to the significance of the specific keyword.

The correlation score may be calculated by sequentially determining the keywords included in the reference note as the specific keywords and adding the values obtained by applying the weight for each of the specific keywords to the significance of the specific keyword calculated for each of the determined specific keywords.

The note providing method performed in a user terminal may further comprise receiving feedback from the user on whether or not to accept each of the plurality of target notes displayed according to the ranking of the correlation scores.

The weight for the keyword may be updated according to whether or not to accept each of the plurality of target notes.

The weight for the keyword may be when accepting a specific target note among the plurality of target notes, updated to increase the weights of the keywords that are common to the reference note and the specific target note, and when rejecting a specific target note among the plurality of target notes, updated to decrease the weights of the keywords that are common to the reference note and the specific target note.

BRIEF DESCRIPTION OF DRAWINGS

FIG. 2 is an exemplary diagram illustrating keywords and weights according to an embodiment of the present invention.

FIG. 3 is an exemplary diagram illustrating keyword-page indexing according to an embodiment of the present invention.

FIG. 6 is an exemplary diagram illustrating correlation score calculation according to keyword distribution in notes according to an embodiment of the present invention.

DETAILED DESCRIPTION

Figure 1:
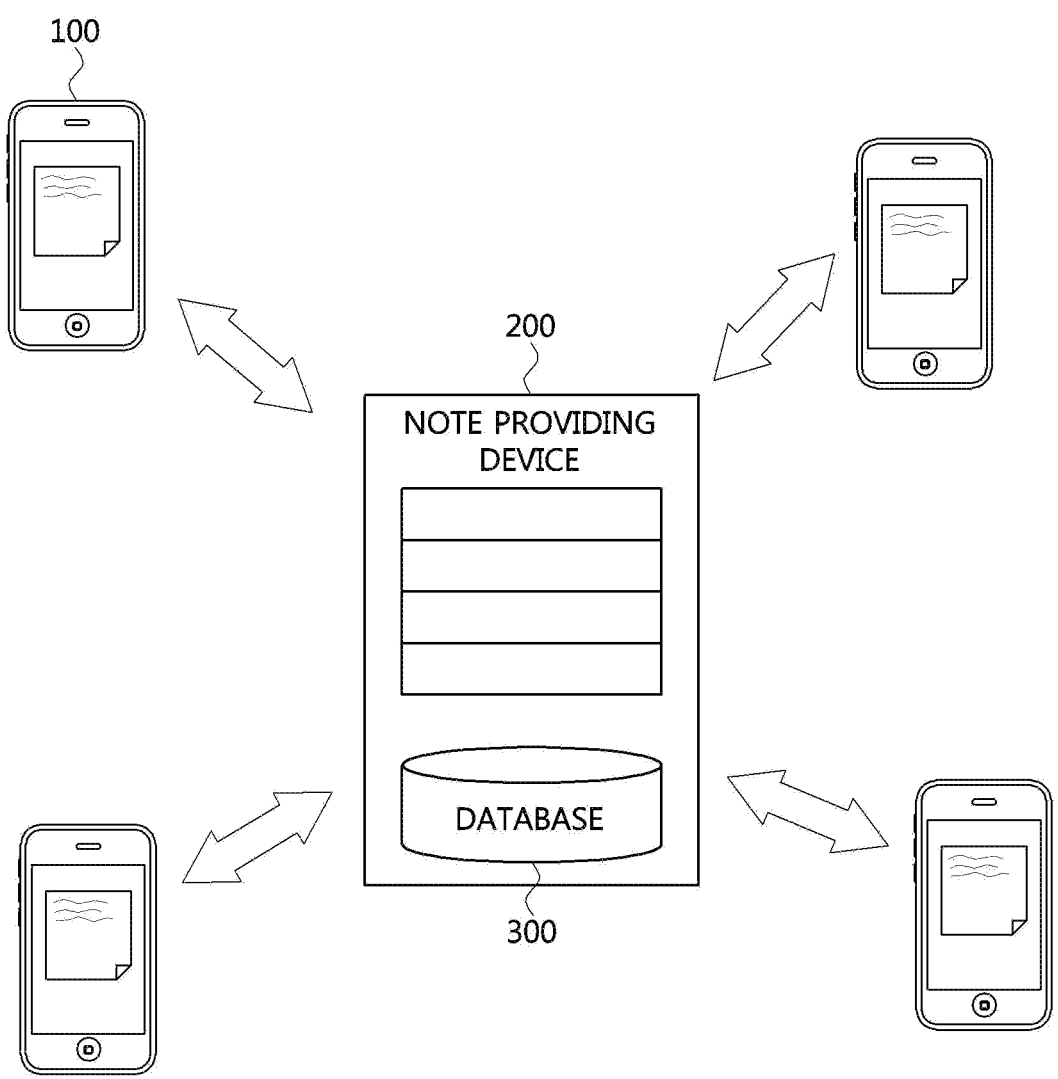
FIG. 1 is a conceptual diagram illustrating an environment that supports a note providing method according to an embodiment of the present invention.

Example embodiments of the present invention are disclosed herein. However, specific structural and functional details disclosed herein are merely representative for purposes of describing the example embodiments of the present invention, however, the example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms ""a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 is a conceptual diagram illustrating an environment that supports a note providing method according to an embodiment of the present invention.

Referring to FIG. 1, the note providing method according to an embodiment of the present invention is performed by allowing a plurality of user terminals 100 to interwork with note providing device 200.

In detail, the user may write or create a note using the user terminal 100, and the note written or created by the user terminal 100 is transmitted to the note providing device 200. Here, the user terminal 100 may mean a mobile phone, a smart phone, a notebook, a tablet PC, and the like, and is not particularly limited in the present invention.

Further, in the present invention, the note stores relatively simple information in a digital form and may be used as a concept equivalent to a digital note, a memo, a digital memo, a page, a digital page, and the like.

The note providing device 200 may receive a plurality of notes written or created by the user terminal 100 and store them in the database 300. However, the note providing device 200 is not limited to being implemented as a separate physical device from the user terminal 100 as shown in FIG. 1.

For example, the note providing device 200 may be provided as a form of an application installed in each user terminal 100. That is, the user terminal 100 may download and install an application that performs a function corresponding to the note providing device 200 from an App Store or the like.

The user may write or create a plurality of notes by inputting information through the user terminal 100. In addition, the user may search for a note that he/she wants to browse through a search using the user terminal 100.

The note providing device 200 may extract and provide a plurality of target notes correlated with the note that the user wants to browse through the user terminal 100.

In detail, the note providing device 200 may calculate correlation scores indicating correlations between the notes generated through the user terminal 100. Here, the correlation scores may mean scores that are expressed by ranking the correlations between notes.

In particular, the note providing device 200 according to an embodiment of the present invention may calculate the correlation scores on a basis of keywords.

For example, keywords are shared between notes, whereby it may be determined that the more keywords are shared, the higher the correlation. In addition, it may be determined that the correlation is higher when a specific keyword is shared only between specific notes.

Accordingly, the note providing device 200 may extract a keyword from a note generated by the user terminal 100, and construct a keyword DB using the extracted keyword. Here, the keyword DB may be constructed in the database 300 in the note providing device 200.

In particular, the keyword DB may reflect a weight of a user-specific keyword. Specifically, the note providing device 200 may receive a user's simple feedback from the user terminal 100 and update the weight of the keyword. For example, when the note providing device 200 ranks the correlation between notes and provides them through the user terminal 100, the user may respond to the ranked and provided notes by determining whether or not to accept the notes. Thus, the note providing device 200 may receive this response from the user and intelligently update the weights of the keywords.

FIG. 2 is an exemplary diagram illustrating keywords and weights according to an embodiment of the present invention, and FIG. 3 is an exemplary diagram illustrating keyword-page indexing according to an embodiment of the present invention.

Referring to FIG. 2, the note providing device 200 according to the present invention may manage the keywords included in the note by assigning weights to each user or each note, and store and manage them in a form of a keyword DB.

Specifically, a weight of a keyword may be managed for each user. For example, words such as 'phone number', 'email', 'contact', etc. may be set as keywords and weights thereof may be set and updated. Referring to FIG. 2, the weights may be determined in an order of 'phone number', 'email', and 'contact', which may be adjusted or changed in real time by an action or feedback of the user.

Referring to FIG. 3, the note providing device 200 may index a note for each keyword.

In FIG. 3, 'page UID' means note identification information, and 'Term Count' means the number of specific keywords included in a note matched with the specific page UID.

The note providing device 200 may store and manage the results of indexing notes for each keyword in a form of a keyword DB.

For example, it may mean that the keyword 'business plan' exists three times in a note of 'page UID=1', and the keyword 'homecoming' exists six times in a note of 'page UID=18'.

Figure 4:
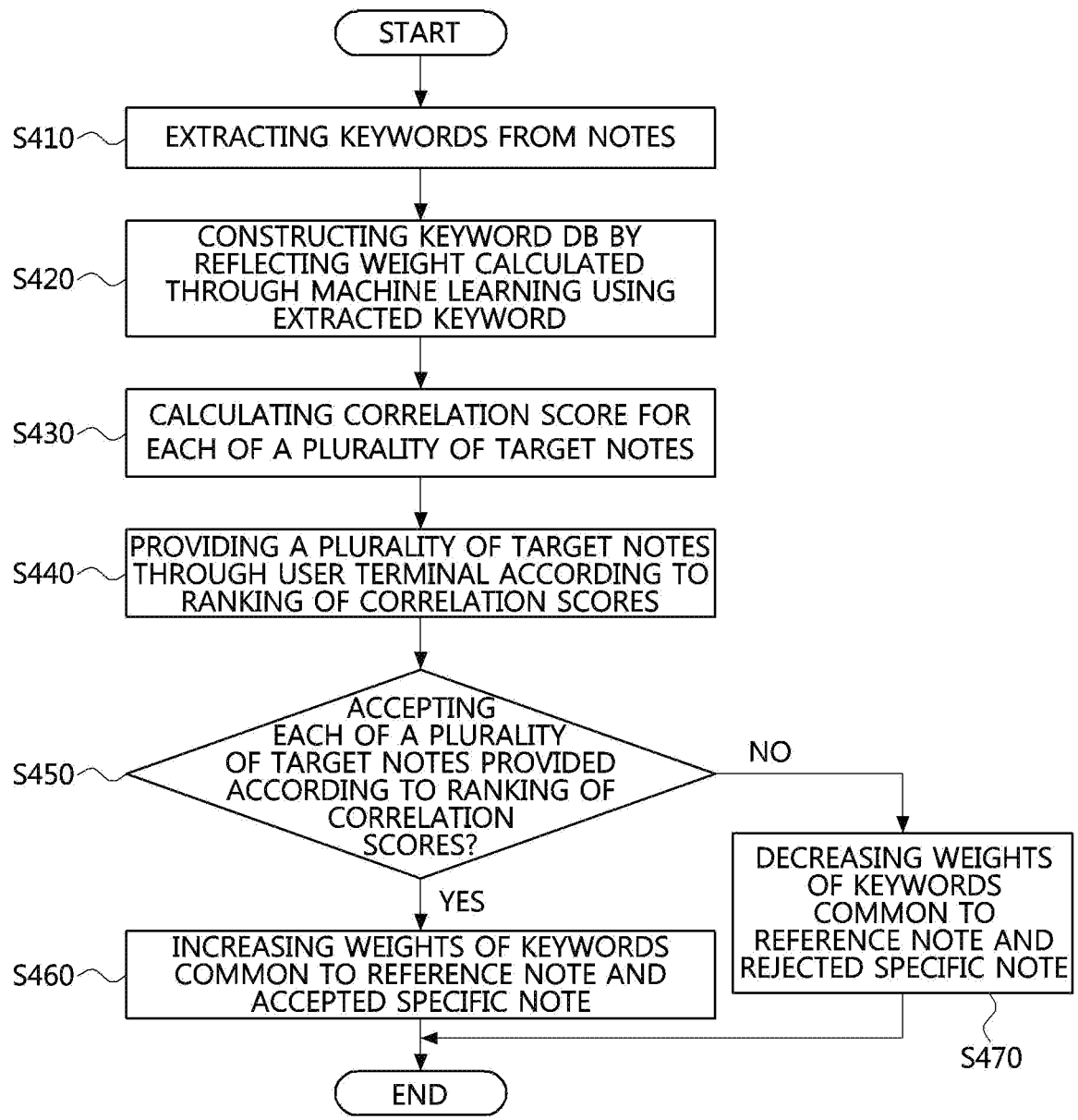
FIG. 4 is a flowchart illustrating a note providing method performed by a note providing device according to an embodiment of the present invention.

FIG. 4 is a flowchart illustrating a note providing method performed by the note providing device according to an embodiment of the present invention.

Referring to FIG. 4, the note providing device 200 according to the embodiment of the present invention extracts keywords from notes generated through the user terminal 100 (S410). In detail, the note providing device 200 may understand or process the text contained in the note through Natural Language Processing. That is, the note providing device 200 may perform extraction of and comprehension on keywords through morphological analysis and semantic analysis on the text in the note.

The note providing device 200 may construct the keyword DB by reflecting the weight calculated through machine learning using the extracted keyword (S420). That is, the note providing device 200 may set a weight for a keyword and manage the weight with a keyword DB as described in FIG. 2. In particular, the note providing device 200 may update the weight for the keyword on a basis of a usage pattern of the user, feedback from the user, etc., and a detailed description thereof will be described later.

The note providing device 200 may calculate the correlation score for each of the plurality of target notes correlated with a reference note using the keyword DB (S430).

In detail, the note providing device 200 calculates a significance of a specific keyword by using the number of times that the specific keyword among the keywords included in the reference note is extracted from each of the plurality of target notes, and the number of notes in which the specific keyword is included among a group of notes including the reference note and the plurality of target notes.

The note providing device 200 may calculate the weight for the specific keyword as the correlation score using a value applied to the significance of the specific keyword. For example, the note providing device 200 may calculate the correlation scores by sequentially determining the keywords included in the reference note as the specific keyword, and adding the values obtained by applying the weight for each specific keyword to the significance of the specific keyword calculated for each determined specific keyword.

The note providing device 200 may provide a plurality of target notes correlated with the reference note through the user terminal 100 according to ranking of the correlation scores (S440).

The note providing device 200 may receive feedback through the user terminal 100 on whether or not to accept each of the plurality of target notes provided according to the ranking of the correlation scores, and thus confirm whether or not to accept each of the plurality of target notes provided according to the ranking of the correlation scores (S450).

In particular, the note providing device 200 may update the weight for the keyword according to whether or not to accept each of the plurality of target notes (S460 and S470).

For example, when the note providing device 200 accepts a specific target note among the plurality of target notes, it is possible to increase the weights of keywords that are common to the reference note and the specific target note (S460).

In addition, when the note providing device 200 rejects the specific target note among the plurality of target notes, it is possible to decrease the weights of the keywords that are common to the reference note and the specific target note (S470).

Furthermore, the note providing device 200 may exclude a keyword in which the updated weight is determined to be less than or equal to a preset value from the keywords by adding the keyword to an exclusion dictionary.

Figure 5:
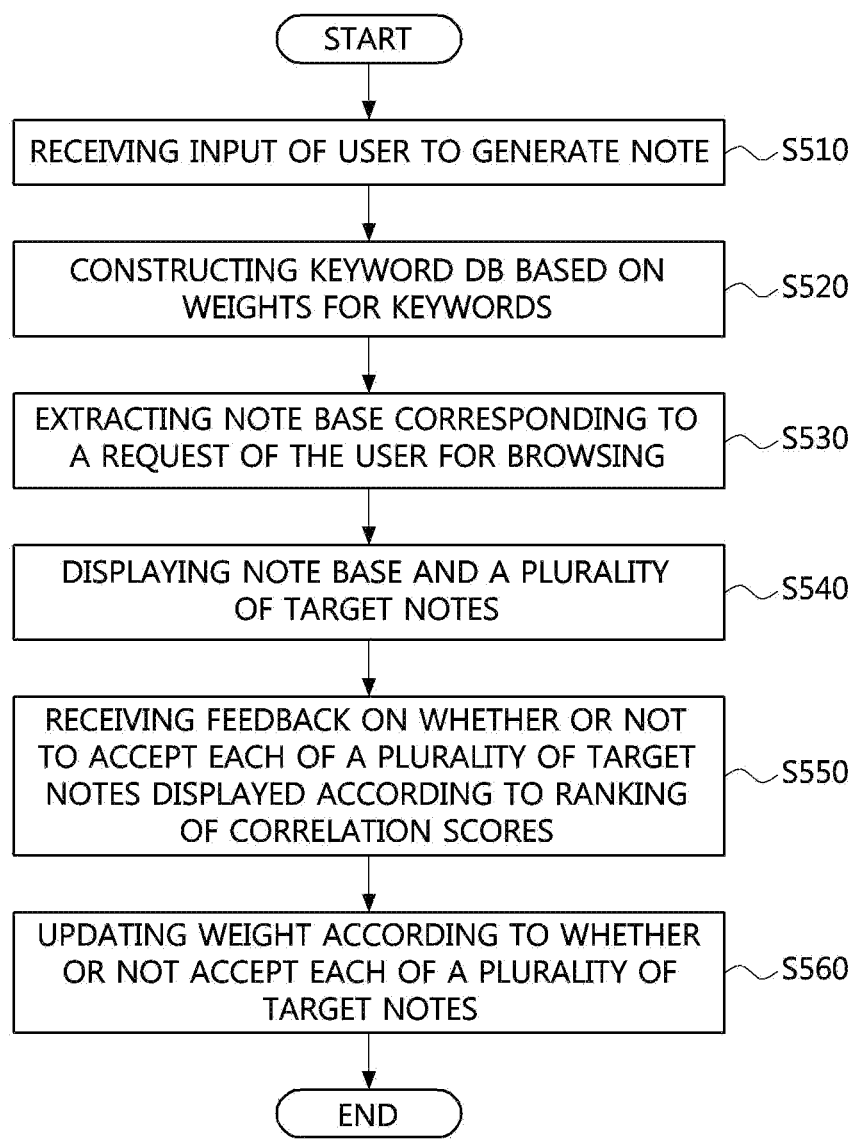
FIG. 5 is a flowchart illustrating a note providing method performed by a user terminal according to an embodiment of the present invention.

FIG. 5 is a flowchart illustrating a note providing method performed by a user terminal according to an embodiment of the present invention.

Referring to FIG. 5, the user terminal 100 according to an embodiment of the present invention may provide a note recommendation service that interworks with the note providing device 200 to be specialized for a user. Here, the user terminal 100 may be operated to interwork with the note providing device 200 of the outside or may be operated to interwork with the note providing device 200 of an application type installed in the user terminal 100.

The user terminal 100 may receive an input of the user to generate a note (S510). Here, the note stores relatively brief information in a digital form and may be used as a concept equivalent to a digital note, a memo, a digital memo, a page, a digital page, and the like.

The user terminal 100 may transmit the generated note to the note providing device 200 to construct a keyword DB based on a keyword and a weight for the keyword included in the note (S520).

The user terminal 100 may extract a reference note corresponding to a request of the user for browsing (S530). For example, when the user needs browsing of a specific note among the notes created and stored by the user terminal 100 and thus inputs the request for browsing to the user terminal 100, the user terminal 100 may extract notes corresponding to the request for browsing. Here, a note of which the user sends the request for browsing through the user terminal 100 may be referred to as a reference note.

The user terminal 100 may receive a plurality of target notes correlated with the reference note from the note providing device 200 to display the reference note and the plurality of target notes (S540).

In detail, the user terminal 100 may display a plurality of target notes according to the ranking of the correlation scores calculated for each of the plurality of target notes correlated with the reference note, using the keyword DB.

Here, the correlation scores may be calculated by the note providing device 200 described above. For example, the correlation score may be calculated by calculating a significance of a specific keyword using the number of times that the specific keyword among the keywords included in the reference note is extracted from each of the plurality of target notes, and the number of notes in which the specific keyword is included among a group of notes including the reference note and the plurality of target notes, and using a value obtained by applying a weight for the specific keyword to the significance of the specific keyword. More specifically, the correlation score may be calculated by sequentially determining the keywords included in the reference note as the specific keyword, and adding the values obtained by applying the weight for each specific keyword to the significance of the specific keyword calculated for each determined specific keyword.

The user terminal 100 may receive feedback from the user on whether or not to accept each of the plurality of target notes displayed according to the ranking of the correlation scores (S550). For example, the user may approve/accept or refuse/reject the note recommended by the note providing device 200 according to the ranking of the correlation scores, thereby providing feedback on whether or not to satisfy the recommendation.

In addition, the user terminal 100 may update the weight for the keyword according to whether or not accept each of a plurality of target notes (S560).

For example, when accepting the specific target note among a plurality of target notes, the weights of the keywords that are common to the reference note and the specific target note may be updated to be increased. In addition, when rejecting the specific target note among a plurality of target notes, the keywords that are common to the reference note and the specific target note may be updated to be decreased.

Figure 7:
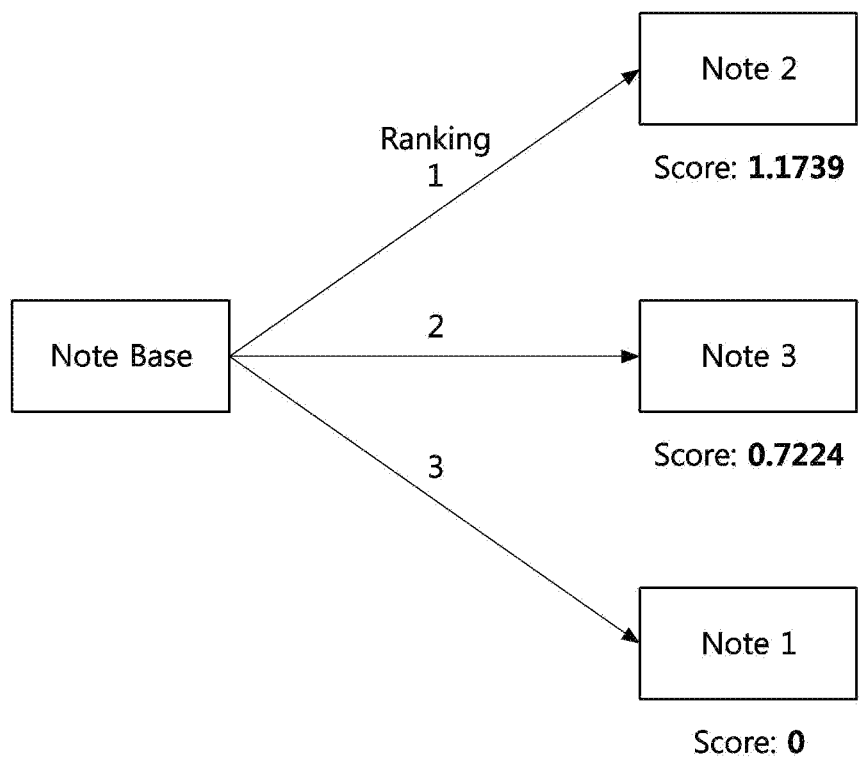
FIG. 7 is an exemplary diagram illustrating a method of ranking and displaying notes according to an embodiment of the present invention.

FIG. 6 is an exemplary diagram illustrating correlation score calculation according to keyword distribution in notes according to an embodiment of the present invention, and FIG. 7 is an exemplary diagram illustrating a method of ranking and displaying notes according to an embodiment of the present invention.

First, referring to FIG. 6, a method by which the note providing device 200 calculates the correlation score will be described.

Considering a group of notes, it is possible to calculate a statistical value on how significant a keyword is in a specific note, which may be referred as to 'significance of keyword'.

The significance of keyword is proportional to a frequency of appearance of the specific keyword in the note. In addition, the significance of keyword is inversely proportional to the number of notes in which the specific keyword appears among the group of notes. That is, it may be determined that the significance of keyword is high when the specific keyword appears frequently only in the specific note.

A method for calculating the significance of keyword is as follows.

$$tf(t,d) = \text{term count} \qquad \text{[Equation 1]}$$

Equation 1 described above means a frequency of appearance of a keyword t in a specific note d.

$$idf(t, D) = \log \frac{N}{n_t} \qquad \text{[Equation 2]}$$

The Equation 2 described above represents an inverse of the frequency nt of appearance of the keyword t in a group D of notes (the number of notes: N).

$$tfidf(t,d,D) = tf(t,d) \times idf(t,D) \qquad \text{[Equation 3]}$$

Therefore, the significance of a keyword may be calculated by multiplying Equation 1 by Equation 2 as in Equation 3 above.

In addition, the keywords are shared between the notes, in which it may be determined that the more the shared keywords, the higher the correlation. In addition, it may be determined that the correlation is high when a specific keyword is shared only between specific notes.

Therefore, the correlation score according to the embodiment of the present invention may be calculated by Equation 4 below.

$$\sum_{k_1}^{k_n} tfidf(t_k, d, D) w_k, \, (k_n \in d_b) \qquad \text{[Equation 4]}$$

According to Equation 4 above, the correlation score is calculated by adding the values obtained by applying the weight for each keyword to the significance tfidf of the keyword in the target note for each keyword kn included in the reference note db.

That is, the correlation score may be calculated by sequentially determining the keywords included in the reference note as the specific keyword, and adding the values obtained by applying the weight for the specific keyword to the significance of the specific keyword calculated for each determined specific keyword.

The application of the Equations 1 to 4 above will be described hereinafter as an example.

Referring to FIG. 6, the reference note Note Base includes four keywords, and weights thereof are set at 1.0 to 1.3. In addition, the reference note Note Base may be correlated with three different target notes (Note 1, Note 2, and Note 3). That is, a group of notes may be consisted with four notes.

First, in FIG. 6, the correlation score between the reference note Note Base and the target note Note 1 may be calculated as in Equation 5 below.

$$tfidf(\text{this}, d1, D) =$$
$$tf(\text{this}, d1) \times idf(\text{this}, D) = 1 \times \log\left(\frac{4}{4}\right) = 0$$
$$tfidf(\text{is}, d1, D) = tf(\text{is}, d1) \times idf(\text{is}, D) = 1 \times \log\left(\frac{4}{4}\right) = 0$$
$$\sum_{k_1}^{k_n} tfidf(t_k, d, D)w_k = (0 \times 1.0) + (0 \times 1.1) = 0$$
[Equation 5]

Referring to Equation 5 above, the reference note Note Base and the target note Note 1 share 'this' and 'is' as keywords. Therefore, the correlation score $\Sigma_{k_1}^{k_n} tfidf(t_k, d, D)w_k$ may be calculated by calculating the significance tfidf of each of 'this' and 'is' and adding the values obtained by applying the weight thereto. Therefore, the correlation score between the reference note Note Base and the target note Note 1 may be calculated as zero.

Next, the correlation score between the reference note Note Base and the target note Note 2 in FIG. 6 may be calculated as in Equation 6 below.

$$tfidf(\text{this}, d2, D) =$$
$$tf(\text{this}, d2) \times idf(\text{this}, D) = 1 \times \log\left(\frac{4}{4}\right) = 0$$
$$tfidf(\text{is}, d2, D) = tf(\text{is}, d2) \times idf(\text{is}, D) = 1 \times \log\left(\frac{4}{4}\right) = 0$$
$$tfidf(\text{sample}, d2, D) = tf(\text{sample}, d2) \times idf(\text{sample}, D) =$$
$$3 \times \log\left(\frac{4}{2}\right) = 3 \times 0.3010 = 0.9030$$
$$\sum_{k_1}^{k_n} tfidf(t_k, d, D)w_k =$$
$$(0 \times 1.0) + (0 \times 1.1) + (0.9030 \times 1.3) = 1.1739$$
[Equation 6]

Referring to Equation 6 above, the reference note Note Base and the target note Note 2 share 'this', 'is', and 'sample' as keywords. Therefore, the correlation score $\Sigma_{k_1}^{k_n} tfidf(t_k, d, D)w_k$ is calculated by calculating the significance tfidf of each of 'this', 'is', and 'sample', and adding the values obtained by applying the weight thereto. Therefore, the correlation score between the reference note Note Base and the target note Note 2 may be calculated as 1.1739.

Finally, in FIG. 6, the correlation score between the reference note Note Base and the target note Note 3 may be calculated as Equation 7 below.

$$tfidf(\text{this}, d3, D) =$$
$$tf(\text{this}, d3) \times idf(\text{this}, D) = 1 \times \log\left(\frac{4}{4}\right) = 0$$
$$tfidf(\text{is}, d3, D) = tf(\text{is}, d3) \times idf(\text{is}, D) = 1 \times \log\left(\frac{4}{4}\right) = 0$$
$$tfidf(a, d3, D) =$$
$$tf(a, d3) \times idf(a, D) = 2 \times \log\left(\frac{4}{2}\right) = 2 \times 0.3010 = 0.6020$$
$$\sum_{k_1}^{k_n} tfidf(t_k, d, D)w_k =$$
$$(0 \times 1.0) + (0 \times 1.1) + (0.6020 \times 1.3) = 0.7224$$
[Equation 7]

Referring to Equation 7 above, the reference note Note Base and the target note Note 3 share 'this', 'is', and 'a' as keywords. Therefore, the correlation score $\Sigma_{k_1}^{k_n} tfidf(t_k, d, D)w_k$ is calculated by calculating the significance tfidf of each of 'this', 'is', and 'a', and adding the values obtained by applying the weight thereto. Therefore, the correlation score between the reference note Note Base and the target note Note 3 may be calculated as 0.7224.

Referring to Equations 5 to 7 above, it will be appreciated that the correlation score of the target note Note 2 is the highest, followed by the correlation score of the target note Note 3, and the correlation score of the target note Note 1 is the lowest, among the three target notes correlated with the reference note.

Therefore, the target notes may be provided to the user terminal 100 in order of decreasing correlation score as shown in FIG. 7. For example, the target notes may be listed according to the ranking based on the correlation scores with respect to the reference note.

Furthermore, according to an embodiment of the present invention, the weight of the keyword may be updated by reflecting the feedback from the user.

Specifically, when the user accepts any one of the ranked target notes as shown in FIG. 7, it may be updated to increase the weights of the keywords that are common to the reference note and the accepted note.

For example, when accepting any one of the ranked target notes, it is possible to increase the weights of the keywords according to Equation 8 below.

$$w = w + 0.001 (w \geq 0.001)$$ [Equation 8]

In addition, when the user rejects any one of the ranked target notes as shown in FIG. 7, it may be updated to decrease the weights of the keywords that are common to the reference note and the rejected note.

For example, when rejecting any one of the ranked target notes, it is possible to decrease the weights of the keywords according to Equation 9 below.

$$w = w - 0.001 (w \geq 0.001)$$ [Equation 9]

However, the present invention is not limited to the case where the weights are updated according to Equation 8 or 9, but the weights may be updated through various algorithms.

Figure 8:
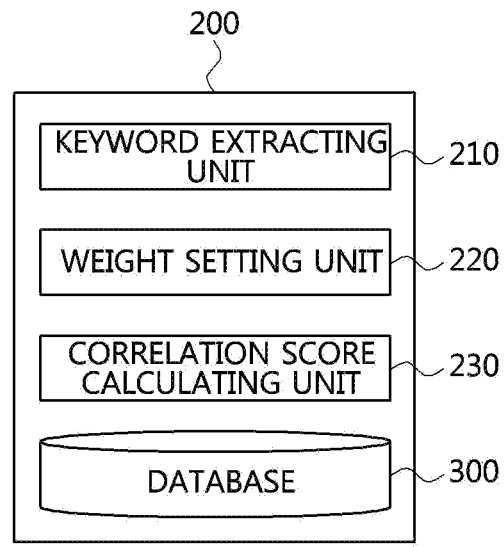
FIG. 8 is a block diagram illustrating a configuration of a note providing device according to an embodiment of the present invention.

FIG. 8 is a block diagram illustrating a configuration of a note providing device according to an embodiment of the present invention.

Referring to FIG. 8, the note providing device 200 according to the embodiment of the present invention includes a keyword extracting unit 210, a weight setting unit 220, a correlation score calculating unit 230, and a database 300. Here, although the database 300 is shown as part of the note providing device 200, it may be implemented as a separate physical device or in the memory of the user terminal 100.

The keyword extracting unit 210 extracts keywords from the notes generated through the user terminal 100. For example, the keyword extracting unit 210 may understand or process the text contained in the note through Natural Language Processing.

The weight setting unit 220 may construct a keyword DB in the database 300 by reflecting weights calculated through machine learning using the extracted keyword. That is, the weight setting unit 220 may set a weight for a keyword and manage the weight with a keyword DB as described in FIG. 2. In particular, the weight setting unit 220 may update the weight for the keyword on a basis of the keyword usage pattern of the user, feedback from the user, and the like.

The correlation score calculating unit 230 may calculate the correlation score for each of a plurality of target notes correlated with the reference note using the keyword DB.

Specifically, the correlation score calculating unit 230 calculates the significance of a specific keyword using the number of times that the specific keyword among the keywords included in the reference note is extracted from each of the plurality of target notes, and the number of notes in which the specific keyword is included among a group of notes including the reference note and the plurality of target notes.

The correlation score calculating unit 230 may calculate the correlation score using the value obtained by applying the weight for the specific keyword to the significance of the specific keyword. For example, the correlation score calculating unit 230 calculates the correlation score by sequentially determining the keywords included in a reference note as the specific keyword, and adding the values obtained by applying the weight for the specific keyword to the significance of a specific keyword calculated for each determined keyword.

The correlation score calculating unit 230 may provide a plurality of target notes correlated with the reference note through the user terminal 100 according to the ranking of the correlation score.

The correlation score calculating unit 230 may receive feedback through the user terminal 100 on whether or not to accept each of the plurality of target notes provided according to the ranking of the correlation score, and thus confirm whether or not to accept each of the plurality of target notes provided according to the ranking of the correlation score.

In particular, the weight setting unit 220 may update the weight for the keyword according to whether or not accept each of a plurality of target notes.

For example, the weight setting unit 220 may increase the weights of keywords that are common to the reference note and the specific target note when accepting the specific target note among a plurality of target notes.

In addition, the weight setting unit 220 may decrease the weights of keywords that are common to the reference note and the specific target note when rejecting the specific target note among the plurality of target notes.

Furthermore, the weight setting unit 220 may exclude, from keywords, a keyword in which the updated weight is determined to be less than or equal to a preset value by adding the keyword to an exclusion dictionary.

Although the configuration of the note providing device 200 according to the embodiment of the present invention has been described with respect to each component for convenience of description, at least two of the components may be combined to form one component, or one component may be divided into multiple components to perform functions, such combination and division of each component is included within the scope of the present invention without departing from the spirit of the present invention.

In addition, the operation of the note providing device according to the embodiment of the present invention can be implemented as a computer-readable program or code on a computer-readable recording medium. A computer-readable recording medium includes all kinds of recording devices in which data that can be read by a computer system is stored. The computer-readable recording medium may also be distributed in a networked computer system so that a computer readable program or code can be stored and executed in the distribution method.

The note providing method and device using the artificial intelligence-based correlation calculation according to the embodiment of the present invention can more accurately recommend the correlated notes by reflecting the interaction of the user.

Also, according to the embodiment of the present invention, it is possible to more accurately provide or recommend a note by learning the weight of the keyword according to the user's interaction and the significance of the keyword in the group of notes.

Further, according to the embodiment of the present invention, it is possible to improve the convenience of searching for notes by more accurately recommending or providing the note that the user needs.

While the example embodiments of the present invention and their advantages have been described in detail, it should be understood that various changes, substitutions and alterations may be made herein without departing from the scope of the invention.

What is claimed is:

1. A method performed by at least one processor comprising:
   extracting, using the at least one processor, a keyword from a document;
   generating, using the at least one processor, a first note from the extracted keyword in a database;
   correlating, using the at least one processor, the first note with at least one second note in the database using a bi-directional link between the first note and the at least one second note.

2. The method of claim 1, wherein the extracting the keyword is performed at a user terminal.

3. The method of claim 2, wherein:
   the generating the first note and is performed on at least one computer system separate from the user terminal;
   the correlating the first note with the at least one second note is performed on the at least one computer system; and
   the at least one computer system is network connected to the user terminal.

4. The method of claim 3, wherein the at least one computer system is at least one server.

5. The method of claim 1, wherein:
   the correlating the first note comprises reflecting a weight calculated through machine learning using the extracted keyword; and the method comprises calculating a correlation score for each of the first note and the plurality of second notes correlated with a reference note using the database.

6. The method of claim 5, wherein the calculating the correlation score comprises:
calculating, using the at least one processor, a number of times that the extracted keyword is included in the reference note; and
associating, using the at least one processor, a weight to the extracted keyword based on the calculated number of times that the extracted keyword is included in the reference note.

7. The method of claim 6, wherein the calculating the correlation score comprises applying the weight associated with the extracted keyword to a significance of the extracted keyword in the reference note.

8. The method of claim 5, comprising providing, using the at least one processor, the plurality of second notes correlated with the reference note according to a ranking of the correlation score.

9. The method of claim 8, comprising receiving feedback, using the at least one processor, through a user terminal on whether or not to accept each of the plurality of second notes according to the ranking of the correlation score.

10. The method of claim 9, comprising updating, using the at least one processor, the weight associated with the extracted keyword according to acceptability of each of the plurality of second notes.

11. A system comprising:
at least one processor;
an extraction unit configured to extract a keyword from a document using the at least one processor;
a generation unit configured to generate a first note from the extracted keyword in a database using the at least one processor;
a correlation unit configured to correlate the first note with at least one second note in the database using a bi-directional link between the first note and the at least one second note using the at least one processor.

12. The system of claim 11, comprising a user terminal, wherein the extraction unit is comprised in the user terminal.

13. The system of claim 12, comprising at least one computer system, wherein:
the at least one computer system is separate from the user terminal;
the at least one computer system is network connected to the user terminal;
the generation unit is comprised in the at least one computer system; and
the correlation unit is comprised in the at least one computer system.

14. The system of claim 13, wherein the at least one computer system comprises at least one server.

15. The system of claim 11, wherein:
the correlation unit is configured to correlate the first note by reflecting a weight calculated through machine learning using the extracted keyword using the at least one processor; and
the correlation unit is configured to calculate a correlation score for each of the first note and the plurality of second notes correlated with a reference note using the database using the at least one processor.

16. The system of claim 15, wherein the correlation score is calculated by:
calculating a number of times that the extracted keyword is included in the reference note using the at least one processor; and
associating a weight to the extracted keyword based on the calculated number of times that the extracted keyword is included in the reference note using the at least one processor.

17. The system of claim 16, wherein the correlation score is calculated by applying the weight associated with the extracted keyword to a significance of the extracted keyword in the reference note using the at least one processor.

18. The system of claim 15, wherein the plurality of second notes correlated with the reference note is provided according to a ranking of the correlation score using the at least one processor.

19. The system of claim 18, wherein the system is configured to receive feedback through a user terminal on whether or not to accept each of the plurality of second notes according to the ranking of the correlation score using the at least one processor.

20. The system of claim 19, the system is configured to update the weight associated with the extracted keyword according to acceptability of each of the plurality of second notes using the at least one processor.

* * * * *